United States Patent Office 3,030,426
Patented Apr. 17, 1962

3,030,426
LOW ASH POLYOXYALKYLENE COMPOUNDS
AND THEIR PREPARATION
John C. Moseley, Little Sutton, Wirral, Glyn Ellis, Oxton, Birkenhead, Edward J. Hayward, Hoole, and Alan C. Houston, West Kirby, Wirral, England, assignors to Shell Oil Company, New York, N.Y., a corporation of Delaware
No Drawing. Filed Dec. 12, 1958, Ser. No. 779,826
Claims priority, application Great Britain Dec. 23, 1957
7 Claims. (Cl. 260—615)

This invention relates to an improvement in the production of polyoxyalkylene compounds and relates more particularly to the production of polyoxyalkylene compounds having a substantially reduced ash content.

There are several well-known methods for preparing polyoxyalkylene compounds. These generally comprise the reacting, usually under elevated pressure, of an alkylene oxide such as ethylene oxide or 1,2-propylene oxide, or a mixture of such alkylene oxides, in the presence of an alkaline catalyst, with an organic compound containing a hydroxyl group such as a glycol or an alcohol. The reaction mixture obtained containing the alkaline catalyst, which is usually an alkali metal, its hydroxide or its alkoxide, is then treated with an acid, generally an inorganic acid such as sulfuric acid or phosphoric acid. The inorganic salt which is formed during this acid treatment by interaction of the acid and the catalyst is then removed by means comprising such steps as decantation, filtration, centrifuging, etc. Although such treatment will remove most of the inorganic salt a substantial part thereof generally remains, either dissolved in, or more often finely dispersed in, the polyoxyalkylene product. This remaining salt is often unavoidably present in proportions of up to 0.3% by weight and higher. It is this remaining salt which is known as ash. The content of this ash in the polyoxyalkylene product may be determined by the Institute of Petroleum Standard Test Method 4/53, and in this specification and attached claims the term "ash content" is intended to mean ash content as determined by this method. Although the ash content may not be troublesome in certain applications, it does give rise to serious problems in other important fields of application of the polyoxyalkylene compounds. For example, when the polyoxyalkylene compound is used as a lubricant the residual inorganic salt will settle out during use and the resulting sediment cause serious trouble. Furthermore, polyoxyalkylene compounds having a low ash content have a decreased tendency to sludge formation and an increased heat stability. Even if the inorganic salt does not sediment out it induces corrosion. For example, polyoxyalkylene fluids having a relatively high ash content are much more corrosive towards cadmium than ash-free polyoxyalkylene fluids. This is particularly so if the metal salt is present as an acid salt. It is therefore immediately apparent that the ability to use the polyoxyalkylene compounds efficiently in many important fields of application is depend upon the absence therein of any substantial amount of ash.

It has now been discovered that polyoxyalkylene compounds having a substantially reduced ash content are obtained, and that many of the processing difficulties inherent in processes used heretofore in preparation of polyoxyalkylene compounds are obviated, by the use of a novel process wherein the alkaline catalyst remaining in the polyoxyalkylene-containing reaction mixture is neutralized by acid treatment and the acid-treated reaction mixture thereafter subjected to treatment with a lower aliphatic alcohol or glycol.

In accordance with the present invention low ash content polyoxyalkylene compounds are obtained by reacting an organic compound having at least one hydroxyl, carboxyl, mercapto or amino group with at least one alkylene oxide in the presence of an alkaline catalyst, contacting the resulting reaction mixture with an acid and thereafter with a lower aliphatic alcohol or glycol.

Organic compounds reacted with an alkylene oxide in accordance with the invention comprise the organic compounds containing at least one hydroxyl, carboxyl, mercapto or amino group. Suitable organic charge materials comprising at least one hydroxyl group include the mono- and di-hydric alcohols, the phenols and naphthols, as well as substituted hydroxy derivatives of these compounds which contain no groups other than hydroxy groups, reactive towards the alkylene oxides or the alkaline catalyst under the reaction conditions employed. Such suitable hydroxy starting materials include the monohydric alcohols, for example alkyl and aralkyl alcohols containing up to twenty carbon atoms to the molecule, particularly the normal, secondary and tertiary alcohols. The lower aliphatic alcohols, for example those having up to about six carbon atoms to the molecule, such as secondary butanol, tertiary pentanol, etc., are somewhat preferred. Normal butanol is a particularly preferred starting material. Other examples of such suitable monohydric alcohol starting materials are lauryl alcohol, 2-ethyl hexanol, benzyl alcohol, etc., as well as the monoethers formed from these alcohols.

The suitable hydroxy compounds used as starting materials comprise the polyhydric alcohols, particularly the dihydric alcohols such as the alkylene and oxyalkylene glycols having a molecular weight between about 62 and about 1000, for example, ethylene glycol, propylene glycol, diethylene glycol, dipropylene glycol, dimers and trimers of such glycol, the monoethers of such glycols, particularly monobutyl ether of ethylene glycol; the polyoxyethylene glycols and polyoxypropylene glycols containing three or more oxyethylene and oxypropylene groups, respectively. The polyoxyalkylene glycols of medium or high molecular weight employed as starting material may have been prepared from the same alkylene oxide to be used in the process of this invention, or a different alkylene oxide, or mixture of alkylene oxides. If the alkylene oxide to be used as a starting material is ethylene oxide the organic hydroxy compound used as starting material may be a polypropylene glycol previously prepared by reacting propylene oxide with a lower glycol. If a glycol is used as starting material it may be prepared in situ by the reaction between an alkylene oxide and water. Other polyhydric alcohols comprise, for example, sorbitol, glycerol and partial ethers and esters thereof, etc.

Hydroxy compounds reacted with alkylene oxide in accordance with the present invention comprise the phenols and naphthols, for example, phenol, the alkyl phenols such as amylphenol, nonylphenol, octylphenol, isopropylphenol, the cresols, resorcinol, etc.; beta-naphthol, etc.

Suitable amino group-containing organic reactants employed as starting material include, for example, mono-, di-, and tri-ethylamine, butyl amine, benzyl ethyl amine, aniline, ethylene diamine, N-methyl amide, etc. Examples of other organic compounds reacted with alkylene oxides in accordance with the invention comprise the carboxylic acids such as acetic acid, propionic acid, trimethylacetic acid, benzoic acid, toluic acid, abietic acid, and the like; the mercaptans such as dodecyl mercaptan, etc., and particularly the aliphatic branched-chain mercaptans having from six to eighteen carbon atoms to the molecule, etc. The organic starting material may be prepared in situ. For example, an organo amino starting material may be prepared in situ by the reaction between ammonia and an alkylene oxide such as propylene oxide.

Alkaline materials are used to catalyze the reaction of the organic component defined above, with the alkylene oxide. The alkaline catalyst used is preferably an alkali metal hydroxide, for example, sodium hydroxide, lithium hydroxide, potassium hydroxide, etc. The alkali metal itself, for example sodium or potassium, may be used. This will generally react with the organic starting material; if the latter is an alcohol, an alkali metal alkoxide will be formed. Other alkaline materials which may be used as catalyst include trimethyl hydroxyethyl ammonium hydroxide.

The amount of catalyst preferably employed may vary according to its alkalinity; generaly less being required if the catalyst is a strong alkali. However, it is preferred that the amount of catalyst present be between about 0.15% and about 1% by weight based on the total weight of reactants. All the alkaline catalyst may be present at the beginning of the reaction or it may be added at definite stages throughout the reaction. In preparing a polyoxyalkylene compound from a polyoxyalkylene compound of lower molecular weight it is preferred to add the catalyst in the form of a solution in the lower molecular weight polyoxyalkylene compound or one having substantially the same molecular weight, substantially as described and claimed in copending application Serial No. 779,044, filed December 9, 1958.

The alkylene oxide reacted with a member of the above-defined organic starting material is preferably a 1,2-alkylene oxide, such as ethylene oxide, 1,2-propylene oxide or 1,2-butylene oxide, etc. although other alkylene oxides such as, for example, butadiene monoxide, amylene oxide, etc. may be used. Cyclic alkylene oxides, for example, cyclohexene oxide and aromatic alkylene oxides, for example, styrene oxide, may also be used. The term "alkylene oxide" as used herein is intended to include the cycloalkylene oxide and aryl-substituted alkylene oxides.

Mixtures of alkylene oxides may also be employed. For example, if a mixture of ethylene oxide and 1,2-propylene oxide is employed a polyoxyalkylene compound is formed in which the ethylene oxide and propylene oxide units are distributed randomly throughout the polyoxyalkylene compound in the same proportions as the alkylene oxides are present in the mixture used. Alternatively two different alkylene oxides may be used alternately, or several different alkylene oxides may be used successively, so giving block copolymers as described below.

The alkylene oxide or alkylene oxides used should preferably be substantially pure and in particular should be substantially free from aldehyde and water. Alkylene oxides containing not more than 0.1% by weight of aldehyde and not more than 0.1% by weight of water are preferred for use in the process of the present invention.

When a desired amount of alkylene oxide, or alkylene oxides, has reacted the reaction mixture is treated with an acid. It is preferred to use an inorganic acid but organic acids such as acetic acid may be employed. Inorganic acids are generally suitable for this purpose, such as, for example, phosphoric acid, sulfuric acid, hydrochloric acid, etc., as well as the weaker acids, such as carbonic acid, which may be introduced by blowing the reaction mixture with carbon dioxide. The amount of acid used should preferably be sufficient to react with all of the alkaline catalyst present, but not substantially exceed this amount. The acid treatment may suitably be carried out at temperatures of from about 0° C. to about 100° C. In general it is preferred to effect the acid treatment at a temperature below about 50° C. for example in the range from about 20° C. to about 45° C.

After the treatment with the acid a lower aliphatic alcohol or glycol solvent is added to the acid-treated reaction mixture. By lower aliphatic alcohol or glycol solvent is meant an alcohol or glycol containing not more than about four carbon atoms per molecule. Thus such suitable alcohols and glycols comprise methanol, ethanol, propanols, butanols, ethylene glycol, propylene glycol and the like, and mixtures thereof, etc. Of these solvents the normal alcohols and especially methanol are preferred.

The lower aliphatic alcohol or glycol, added to the reaction mixture may be added in amounts of for example between about 3% and about 100% by weight based on the weight of the reaction mixture, and more preferably between about 8% and about 30% by weight. The alcohol, or glycol and the reaction mixture should be thoroughly mixed, for example, by stirring, passage through mixing means, etc. If the lower aliphatic alcohol or glycol solvent is not completely miscible in all proportions with the reaction mixture it is preferred that the amount of lower aliphatic alcohol or glycol added be just sufficient to saturate the reaction mixture with the solvent. The optimum amount of alcohol or glycol solvent required for this purpose will vary according to the nature of the specific polyoxyalkylene compound present and the nature of the specific alcohol or glycol solvent used, it is readily determined, however, because addition of more than this amount will generally cause a separate layer of the solvent to separate. The reaction mixture is preferably stirred during the addition of the alcohol and glycol and the resulting admixture left to stand for a period of time may vary within the scope of the invention and which will depend on the amount of reaction mixture being treated. Preferably, the reaction mixture is allowed to stand for from about 1 to about 48 hours, at a temperature, for example, between about 20° C. and about 100° C. Solid material which has separated during the treatment is removed. When a glycol is used as the solvent the reaction mixture is preferably allowed to stand at a slightly elevated temperature, for example, between about 70° C. and about 90° C. as this accelerates separation of any solid phase present.

The mechanism by which the alcohol or glycol used enables the attainment of a product of such substantially lower ash content and by which it assists in separation of solid material is not at present fully understood, but it is probable that the alcohol or glycol solvent increases the solubility of inorganic salt in the reaction mixture and so enables larger crystals of this salt to form at the expense of the smaller by a "ripening" process over a period of time; these larger crystals then separate more readily from the reaction mixture. When alcohol or glycol is not employed the solid material is probably present as a very fine suspension which cannot be removed either by filtration or centrifuging.

The solid material which separates after the treatment with alcohol or glycol consists largely of inorganic salts of the acid used in the acid-treating step. This solid material now separates in a crystalline form which is easily removed, for example, by sedimentation, filtration, centrifuging, and the like, or a combination of two or more of such steps. Filtration rates are high since the solid material in the treated mixture is granular and not gelatinous and so can be filtered rapidly.

After separating the solid phase the alcohol or glycol solvent is separated from the treated polyoxyalkylene product, for example, by distillation under reduced pressure. The polyoxyalkylenes so prepared according to the present invention have a low ash content, generally below 0.01% by weight.

The polyoxyalkylene compounds obtained generally contain a small amount of unreacted alkylene oxide. Although this will not affect the ash content, it may affect other properties of the final products, such as, for example, the flash point. It is generally desirable to remove it. This can be done quite simply by heating the reaction mixture preferably under reduced pressure, for example, about 10 to 50 mm. Hg and preferably in an inert atmosphere for example an atmosphere of nitrogen. Heating, for example, to a temperature of about 90° C. under these conditions is generally effective in removing the residual alkylene oxide. The time taken to remove the alkylene oxide may vary within the scope of the invention. Usually heating as described above for a period of approximately 30 minutes will suffice, especially if the reaction mixture is continually agitated during this period. In the process of the present invention removal of residual alkylene oxide may precede or follow the treatment with the acid or the alcohol treatment. It is sometimes more desirable, however, to carry out the degassing operation, as it is known, before the acid treatment.

Reaction conditions employed during the reaction between the alkylene oxide or alkylene oxides and organic starting material in the presence of the alkaline catalyst may be varied within the broad range of from about 50° C. to about 160° C. It is usually preferred to conduct the reaction under increased pressure, preferably at a pressure between about 20 and about 60 p.s.i.g. and more preferably between about 30 and about 40 p.s.i.g. The pressure in the reaction chamber may be controlled by controlling the rate of addition of alkylene oxide. The reaction is preferably executed at a temperature between about 100° C. and about 125° C. The temperature of the reaction is preferably not permitted to exceed about 130° C. since in some cases some decomposition occurs above this temperature.

A single alkylene oxide, for example ethylene oxide or 1,2-propylene oxide, may be used in the reaction and the reaction conditions and amounts of reactants may be varied to give polyoxyalkylene compounds of any desired molecular weight. The properties of the polyoxyalkylene compounds may be varied by using a different starting material, for example, if an alcohol is used the final product will be a monoether of a glycol whereas if a glycol is used as starting material a polyoxyalkylene glycol will be formed.

However, the properties of the polyoxyalkylene compounds formed may be most readily varied by using two or more different alkylene oxides. For example, polyoxyalkylene compounds containing a high proportion of ethylene oxide tend to be water-soluble whereas polyoxyalkylene compounds containing a high proportion of a higher alkylene oxide, for example, 1,2-propylene oxide, tend to be insoluble in water. Thus many of the properties of the final product, for example its water solubility, may be varied by using varying proportions of the different alkylene oxides employed. This may be done by mixing the alkylene oxides in the desired proportions before feeding this alkylene oxide mixture into the reaction vessel; in this way the various alkylene oxide units should be randomly distributed throughout the chain of the polyoxyalkylene compound. This process has the advantage of being simple, and reasonable control over the constitution of the final product is obtained. However, it suffers from the disadvantage that the two different alkylene oxides will not react at the same rate; for example, higher molecular weight alkylene oxides react more slowly than lower molecular weight alkylene oxide, and this will lead to a preponderance of lower alkylene oxide units in the part of the polyoxyalkylene compound which is formed first. Moreover any unreacted alkylene oxide left at the end of the reaction will tend to be predominantly the higher molecular weight alkylene oxide used and this will lead to increased difficulties in degassing the polyoxyalkylene compound i.e. removing unreacted alkylene oxide.

Another way of varying the properties of the polyoxyalkylene compound is to use as starting material a previously-prepared polyoxyalkylene glycol or monoether of such a compound and then react this compound with an alkylene oxide different from the one used to prepare the starting material. For example, if a polypropylene glycol, which would be water-insoluble, is used as starting material and reacted with ethylene oxide the polyoxyalkylene compound formed has increased water solubility, the extent of this increase in water solubility depending upon the amount of ethylene oxide reacted.

A method which it is preferred to employ in the preparation of the polyoxyalkylene compound is that of block copolymerization. This method has the advantage that a much closer control is obtained over the final constitution of the product, i.e. the proportion of various alklene oxide units reacting and their positioning in the molecule of the polyoxyalkylene compound. Moreover it may easily be arranged that the last alkylene oxide to be reacted in the alkylene oxide with the lowest boiling point and this procedure facilitates the degassing of the final product. This block copolymerization method comprises condensing an organic compound containing at least one hydroxyl, mercapto or amino group in the presence of an alkaline catalyst, with one or more equivalents of an alkylene oxide, subsequently with one or more equivalents of an alkylene oxide different from the first alkylene oxide, and then with one or more equivalents of an alkylene oxide different from the second alkylene oxide.

If desired, one or more further condensation steps may be carried out, in each of which one or more equivalents of an alkylene oxide, which is different from the one used in the preceding step, is used.

In this process the alkylene oxides are added in blocks, the size of which may readily be controlled. Preferably constant amounts of two different alkylene oxides are condensed alternately. The relative amounts of the two different alkylene oxides used in each condensation stage may be varied thus varying the ratio of the two different alkylene oxide units in the final product. For example, an alcohol such as butyl alcohol may be condensed with ethylene oxide and propylene oxide alternately, a fixed amount of ethylene oxide or a different fixed amount of propylene oxide being used in each condensation stage. Preferably these two fixed amounts of alkylene oxides reacting are such that condensation with a fixed amount of ethylene oxide followed by condensation with a fixed amount of propylene oxide increases the molecular weight of the product by about 400. The ratio of ethylene oxide to propylene oxide is preferably between 15:85 and 18:15. If the starting material already contains units of one of the alkylene oxides to be used, the first charge of that alkylene oxide is reduced by the corresponding amount. Thus for example if monobutyl ether of ethylene glycol is used as starting material and one of the alkylene oxides to be used is ethylene oxide, the first charge of ethylene oxide is reduced by the appropriate amount to compensate for the proportion of ethylene oxide units already present in the starting material.

The present invention is illustrated by the following examples in which the term p.b.w. means parts by weight.

EXAMPLE I

A stainless steel reactor fitted with stirrer and heating coils was used. A solution of 2.1 p.b.w. of potassium hydroxide in 41.6 p.b.w. of the monobutyl ether of ethylene glycol was placed in the reactor and the reactor purged with nitrogen. The reactor was closed and the contents heated to 110° C. Liquid ethylene oxide (6 p.b.w.) was then added to the reaction mixture and the ethylene oxide feed rate adjusted to maintain the pressure in the reactor at 50 to 60 p.s.i.g. The temperature of the reaction mixture was never allowed to exceed 125° C. After the first charge of ethylene oxide had reacted, propylene oxide (120 p.b.w.) was fed into the reaction mixture, the feed rate being such that a pressure of 50 to 60 p.s.i.g. was maintained. After this propylene oxide had reacted a further charge of ethylene oxide (22 p.b.w.) was added. Similar charges of propylene oxide and ethylene oxide to those described above were then added alternately. Each fresh charge was added only when the previous charge had substantially all reacted. This process was continued until the total amount of ethylene oxide added was 116 p.b.w. and the total amount of propylene oxide added was 720 p.b.w. When the final charge of propylene oxide had reacted the pressure was allowed to drop to 20 p.s.i.g. before the reactor was cooled. The total reaction time was 13 hours 30 minutes. A portion of the reaction mixture (337 p.b.w.) was stripped by heating in water bath under reduced pressure in the presence of nitrogen for 6 hours. The reaction mixture was treated with phosphoric acid to neutralize the alkaline catalyst present and filtered. The residual polyoxyalkylene compound which now amounted to 321 p.b.w. was free from alkylene oxide and had an ash content of 0.29% by weight. The polyoxyalkylene fluid was then divided into several portions and each portion was homogenized with a different quantity of methanol by stirring for a short time. In some cases small quantities of water were also added to the mixture. After standing for about one-half hour a precipitate appeared in the solution and gradually settled to the bottom of the vessel. The mixtures were then allowed to stand in the atmosphere for varying periods of time and then filtered to remove the inorganic material. Finally the methanol, and water if present, were removed by distillation under nitrogen. The results obtained are shown in Table I.

Table I

| Amount of Polyoxy-Alkylene Compound Treated | Amount of Methanol Used | Amount of Water Added | Time of Standing | Ash Content of Methanol Treated Product, Percent w. |
|---|---|---|---|---|
| 2,700 g. | 1,000 g. | | 2 days | 0.03 |
| 1,000 g. | 100 g. | | 3 days | 0.01 |
| 1,000 g. | 1,000 g. | | 3 days | 0.03 |
| 1,000 g. | 2,000 g. | | 3 days | 0.03 |
| 1,000 g. | 100 g. | | 2 days | 0.01 |
| 82 kg. | 9.1 kg. | | 1 day | 0.035 |
| 305.5 kg. | 33.4 kg. | | 1 day | 0.02 |
| 2,000 g. | 200 g. | | 5 weeks | 0.005 |
| 180 g. | 20 g. | | 1 day | 0.035 |
| 180 g. | 20 g. | 1 g. | 1 day | 0.01 |
| 180 g. | 20 g. | 5 g. | 1 day | 0.035 |
| 150 g. | 50 g. | | 1 day | 0.025 |
| 150 g. | 50 g. | 2.5 g. | 1 day | 0.03 |
| 150 g. | 50 g. | 12.5 g. | 1 day | 0.04 |

EXAMPLE II

Samples of the polyoxyalkylene compound prepared as described in Example I were treated with varying quantities of different alcohols and glycols. The polyoxyalkylene compound was homogenized with the solvent by stirring the mixture for a short time and the solution was allowed to stand in an open vessel for varying periods of time and was then filtered to remove the precipitated inorganic material. The solvent was removed by distillation under nitrogen and the ash content of the product determined. The results obtained are shown in Table II.

Table II

| Solvent | Ratio (by weight) of Polyoxyalkylene Compound to solvent | Time of Standing | Ash Content of Treated Product, Percent w. |
|---|---|---|---|
| Methanol | 9:1 | 2 days | 0.01. |
| Do | 1:1 | 2 days | 0.10. |
| Industrial Ethyl Alcohol | 9:1 | 2 days | 0.09. |
| Do | 1:1 | 2 days | 0.03. |
| Isopropanol | 1:1 | 2 days | 0.03. |
| Normal Propanol | 1:1 | 2 days | 0.02. |
| Secondary Butanol | 1:1 | 2 days | 0.06. |
| Ethylene Glycol | 9:1 | 2 days | 0.02 (after refiltration). |
| Do | 9:1 | 1 day (at 80° C.) | 0.03. |

The invention claimed is:

1. In the process for the production of polyoxyalkylene compounds wherein an organic compound selected from the group consisting of the alkylene and oxyalkylene glycols having a molecular weight of from about 62 to about 1000 and the monoethers thereof is reacted with a 1,2-alkylene oxide having from two to four carbon atoms to the molecule in the presence of an alkaline catalyst selected from the group consisting of the alkali metals and their hydroxides at a temperature of from about 50° C. to about 160° C., the improvement of contacting the resulting reaction mixture with an acid selected from the group consisting of phosphoric, sulfuric, hydrochloric and carbonic acid to neutralize the alkaline catalyst and thereafter with a member of the group consisting of aliphatic alcohols and glycol having up to four carbon atoms to the molecule and maintaining said contact of said reaction mixture with said member of the group consisting of aliphatic alcohols and glycols for at least about one hour to produce filterable solid from ash-forming inorganic salt formed by the aforesaid neutralizing and separating said solid from the remainder of the mixture.

2. In a process for the production of a polyoxyalkylene compound wherein an organic compound selected from the group consisting of the alkylene and oxyalkylene glycols having a molecular weight of from about 62 to about 1000 and the monoethers thereof is reacted with a 1,2-alkylene oxide having from two to four carbon atoms to the molecule at a temperature of from about 100° C. to about 125° C. in the presence of an alkaline catalyst selected from the group consisting of the alkali metals and their hydroxides, thereby reacting said alkylene oxide with said organic compound with the formation of a reaction mixture comprising a polyoxyalkylene compound, the improvement of contacting said reaction mixture with an inorganic acid selected from the group consisting of phosphoric, sulfuric, hydrochloric and carbonic acid to neutralize the alkaline catalyst at a temperature of from about 20° C. to about 45° C. and thereafter with methanol at a temperature of from about 20° C. to about 100° C. and maintaining said contact of said reaction mixture with said methanol at said temperature for at least about one hour to produce filterable solid from ash-forming inorganic salt formed by the aforesaid neutralizing and separating said solid from the remainder of the mixture.

3. In a process for the production of a polyoxyalkylene compound wherein a monobutyl ether of ethylene glycol is reacted with a 1,2-alkylene oxide having from two to four carbon atoms to the molecule in the presence of an alkaline catalyst selected from the group consisting of the alkali metals and their hydroxides at a temperature of from about 100° C. to about 125° C., thereby forming a reaction mixture comprising a polyoxyalkylene compound the improvement of contacting said reaction mixture with an acid selected from the group consisting of phosphoric, sulfuric, hydrochloric and carbonic acid to neutralize the alkaline catalyst and thereafter with a member of the group consisting of aliphatic alcohols and glycols having up to four carbon atoms to the molecule at a temperature of from about 20° C. to about 100° C. and maintaining said contact of said reaction mixture with said member of the group consisting of aliphatic alcohols and glycols for at least about one hour to produce filterable solid from ash-forming inorganic salt formed by the aforesaid neutralizing and separating said solid from the remainder of the mixture.

4. The process in accordance with claim 3 wherein said alcohol is methanol.

5. The process in accordance with claim 3 wherein said reaction mixture is contacted with an inorganic acid and thereafter with a glycol having up to four carbon atoms at a temperature of from about 70° C. to about 90° C.

6. In a process for the production of a polyoxyalkylene compound wherein monobutyl ether of ethylene glycol is reacted with ethylene oxide at a temperature of from about 100° C. to about 125° C. in the presence of an alkaline catalyst selected from the group consisting of the alkali metals and their hydroxides thereby forming a reaction mixture comprising a polyoxyalkylene compound, the improvement of treating said reaction mixture with an inorganic acid selected from the group consisting of phosphoric, sulfuric, hydrochloric and carbonic acid to neutralize the alkaline catalyst and thereafter with a member of the group consisting of aliphatic alcohols and glycols having up to four carbon atoms to the molecule at a temperature of from about 20° C. to about 100° C. and maintaining said contact between said reaction mixture and said member of the group consisting of aliphatic alcohols and glycols at said temperature for a period of time of from about one to about forty-eight hours to produce filterable solid from ash-forming inorganic salt formed by the aforesaid neutralizing and separating said solid from the remainder of the mixture.

7. In a process for the production of a polyoxyalkylene compound wherein monobutyl ether of ethylene glycol is reacted with propylene oxide in the presence of an alkaline catalyst selected from the group consisting of the alkali metals and their hydroxides at a temperature of from about 100° C. to about 125° C., thereby forming a reaction mixture comprising a polyoxyalkylene compound, the improvement of treating said reaction mixture with an inorganic acid selected from the group consisting of phosphoric, sulfuric, hydrochloric and carbonic acid to neutralize the alkaline catalyst at a temperature of from about 20° C. to about 45° C. and thereafter with a member of the group consisting of aliphatic alcohols and glycols having up to four carbon atoms to the molecule at a temperature of from about 20° C. to about 100° C. and maintaining said contact between said reaction mixture and said member of the group consisting of aliphatic alcohols and glycols at said temperature for a period of time of from about one to about forty-eight hours to produce filterable solid from ash-forming inorganic salt formed by the aforesaid neutralizing and separating said solid from the remainder of the mixture.

References Cited in the file of this patent
UNITED STATES PATENTS

| | | |
|---|---|---|
| 2,425,755 | Roberts et al. | Aug. 19, 1947 |
| 2,425,845 | Toussaint et al. | Aug. 19, 1947 |
| 2,492,955 | Ballard et al. | Jan. 3, 1950 |
| 2,641,614 | Britton et al. | June 9, 1953 |
| 2,723,294 | Benoit | Nov. 8, 1955 |
| 2,733,272 | Horsley et al. | Jan. 31 1956 |